United States Patent
Haraszti

(10) Patent No.: US 9,602,357 B2
(45) Date of Patent: Mar. 21, 2017

(54) NETWORK VISUALIZATION SYSTEMS AND METHODS

(71) Applicant: Ciena Corporation, Hanover, MD (US)

(72) Inventor: Zsolt Haraszti, Santa Rosa, CA (US)

(73) Assignee: Ciena Corporation, Hanover, MD (US)

( * ) Notice: Subject to any disclaimer, the term of this patent is extended or adjusted under 35 U.S.C. 154(b) by 128 days.

(21) Appl. No.: 14/301,836

(22) Filed: Jun. 11, 2014

(65) Prior Publication Data

US 2014/0365647 A1    Dec. 11, 2014

Related U.S. Application Data

(60) Provisional application No. 61/833,845, filed on Jun. 11, 2013.

(51) Int. Cl.
   *G06F 15/173* (2006.01)
   *H04L 12/24* (2006.01)
   *H04L 12/26* (2006.01)

(52) U.S. Cl.
   CPC ............. *H04L 41/12* (2013.01); *H04L 41/22* (2013.01); *H04L 43/045* (2013.01)

(58) Field of Classification Search
   CPC ..... H04L 42/12; H04L 41/22; H04L 12/2621; H04L 43/045
   See application file for complete search history.

(56) References Cited

U.S. PATENT DOCUMENTS

| | | | | |
|---|---|---|---|---|
| 5,845,277 A | * | 12/1998 | Pfeil | H04L 41/22 370/270 |
| 2001/0042118 A1 | * | 11/2001 | Miyake | H04L 41/22 709/224 |
| 2005/0212823 A1 | * | 9/2005 | Uthe | H04L 41/22 345/660 |
| 2008/0144534 A1 | * | 6/2008 | Gross | H04L 43/045 370/257 |
| 2010/0306696 A1 | | 12/2010 | Groth | |
| 2011/0316884 A1 | | 12/2011 | Giambalvo | |

* cited by examiner

*Primary Examiner* — Nam Tran
(74) *Attorney, Agent, or Firm* — Clements Bernard PLLC; Christopher L. Bernard; Lawrence A. Baratta, Jr.

(57) ABSTRACT

Example network visualization systems and methods are described. In one implementation, a method displays a network environment as a network graph using a first zoom level. The method receives a request to provide a second zoom level in a particular portion of the network environment. Network components are identified to display at the second zoom level in the particular portion of the network environment. The method further determines which network connections to display at the second zoom level in the particular portion of the network environment and generates a revised network graph containing the identified network components and the determined network connections.

20 Claims, 6 Drawing Sheets

NETWORK VISUALIZATION SYSTEMS AND METHODS

CROSS REFERENCE TO RELATED APPLICATIONS

This application claims the priority benefit of U.S. Provisional Application Ser. No. 61/833,845, entitled "Tiled network view systems and methods", filed Jun. 11, 2013, the disclosure of which is incorporated by reference herein in its entirety

TECHNICAL FIELD

The present disclosure relates to systems and methods that provide a human-understandable visualization of a network environment.

BACKGROUND

Modern networks can be very complex. For example, large networks may span significant geographic distances and contain a large number of interconnected devices (referred to as "nodes"). It can be difficult to visualize all of the nodes and interconnections in such a network. In many cases, it is not possible to clearly display all interconnected network devices in a single display. Further, a single planar view of a large network provides a minimal amount of information since the display is limited to two dimensions.

The systems and methods described herein support visualization of different parts of a network environment in different levels of detail.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
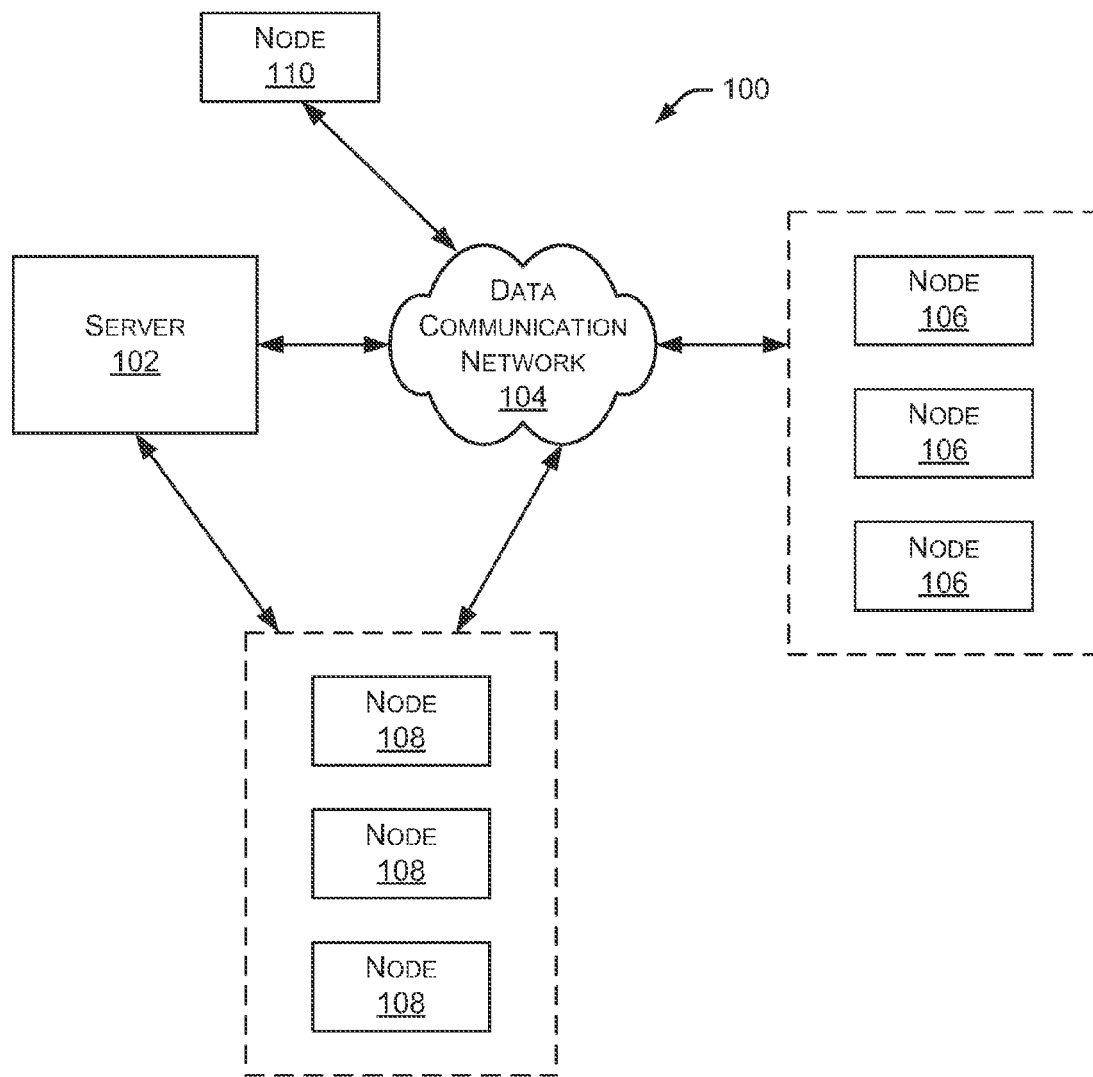
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods discussed herein provide multi-layer network visualization. These systems and methods aid in the comprehension of complex, multi-technology, and multi-layer networks. Additionally, the described systems and methods aid in troubleshooting and cause/effect analysis, for example, by pinpointing locations of problems and visualizing the service impact (including indirect impact) of various events and network conditions. Additionally, the network visualization systems and methods facilitate fact-based decision making while optimizing networks and network components.

FIG. 1 is a block diagram depicting an environment 100 within which an example embodiment may be implemented. Environment 100 may include one or more servers 102 that may each be embodied as one or more server computers each including one or more processors that are in data communication with one another. Server 102 may be in data communication with one or more nodes 106 at first location and one or more nodes 108 that may be at a different location. Individual nodes 106 and 108 may each be node of a network and the multiple nodes at a particular location may be represented as a cluster, which is also defined as a node of a network. Additionally, environment 100 may include any number of other nodes 110. Nodes 106, 108, and 110 may be embodied as any network connected computer or network device such as a desktop computer, laptop computer, tablet computer, smart phone, router, switch, firewall, load balancer, storage node, or the like. Server 102 and nodes 106, 108, and 110 are coupled to a data communication network 104, thereby allowing the server, nodes, and other devices and systems to communicate with one another. Data communication network 104 may be embodied as a peer-to-peer connection between devices, a connection through a local area network (LAN), WiFi network, the Internet, or any other communication medium or system.

Environment 100 represents one example of a networked system that may be visualized according to systems and methods described herein. The number of clusters of nodes 106, 108, servers 102, data communication networks 104, and the arrangement and connections between these components may have any arbitrary configuration and may be organized according to any principle for designing such networks. As noted herein, large networks may be readily visualized according to the described systems and methods.

In a particular embodiment discussed herein, a single layer of the network (e.g., a Metro Ethernet layer) is shown as a network graph. However, not all edges and nodes are shown at all times. The view has the concept of a zoom level, which represents a value in a continuous or discrete zoom scale. Each edge is associated with a zoom threshold, indicating that the edge is to be shown at that zoom threshold level or higher. A node is shown at a given zoom level if it has at least one edge that is shown at the given zoom level.

An example implementation of the described systems and methods include a nationwide Ethernet service network, where the services are provided in a number of metropolitan areas. At the highest zoom level, the whole network is shown (geographically), but it only shows the major hubs and shows aggregated links among the major hubs. As the user zooms closer to a particular metropolitan area, the major rings of the metropolitan area will start to be displayed. Getting closer further (i.e., zooming closer), smaller sub-rings within the metropolitan area will become visible. In some embodiments, this example is implemented using map tiles and a backend server that serves information relevant to a given bounding box on the map. This approach provides a relatively constant amount of information that needs to flow from the backend server to the browser for any given view.

Figure 2:
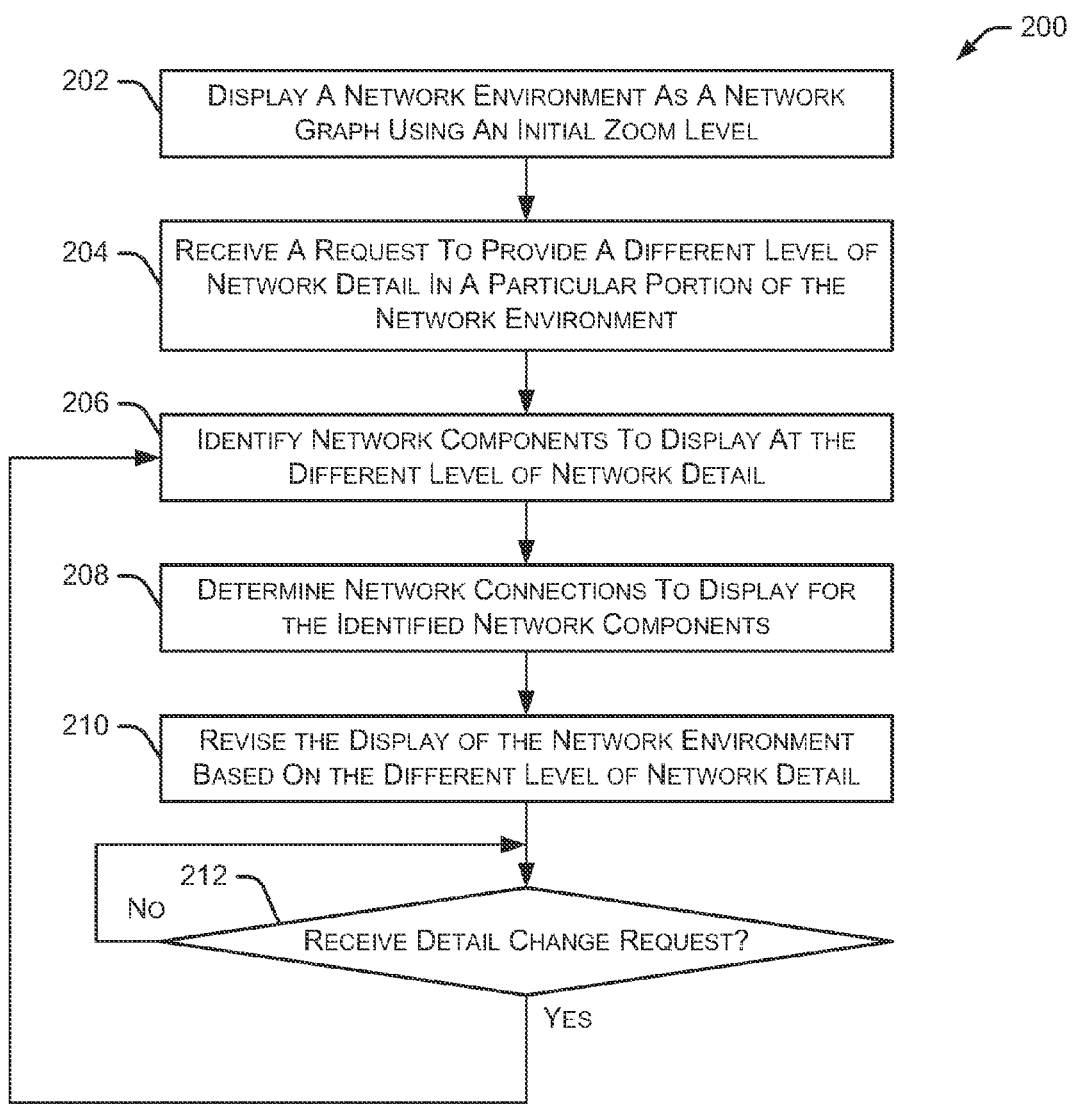
FIG. 2 is a flow diagram depicting an embodiment of a method for providing varying levels of detail regarding a network environment.

FIG. 2 is a flow diagram depicting an embodiment of a method 200 for providing varying levels of detail regarding a network environment. In some embodiments, at least a portion of method 200 is performed by server 102 (FIG. 1). Initially, method 200 displays a network environment as a network graph using an initial zoom level at 202. The initial zoom level may be selected by a user, or may be set as a default value. Method 200 receives a request to provide a different level of network detail in a particular portion (or area) of the network environment at 204. This request may be received from a user (e.g., via a browser application interface) or from another device or system. In some embodiments, the particular portion of the network in which to provide greater detail is identified by clicking in the particular portion of the network, clicking on a node or link in the particular portion of the network, or defining a bounding box around the particular portion of the network.

Method 200 continues by identifying network components to display at the different level of network detail at 206. For example, if the different level of network detail provides more detail in a specific area of the network environment, more nodes in that area will be displayed, as compared to the previous display of a larger area. Method 200 also determines network connections to display for the identified network components at 208. The display of the network environment is revised based on the different level of network detail at 210. The revised display includes the identified network components and network connections mentioned above. Method 200 continues to display the revised network detail until a new detail change request is received at 212. When that occurs, method 200 returns to 206 to generate a new network display based on the new level of network detail requested. The new level of network detail may include greater detail in a particular portion of the network environment, or less detail which results in display of a larger portion of the network environment.

As discussed above with respect to FIG. 2, the systems and methods described herein determine which network components (e.g., nodes, clusters, and connections) to display based on specific data, such as zoom level data (or zoom factor). A server decides what details to display on a network map based on the received zoom level information. Thus, each map is generated based on specific data, such as the zoom level information and the specific area (or network portion) identified by a user.

Figure 3A:
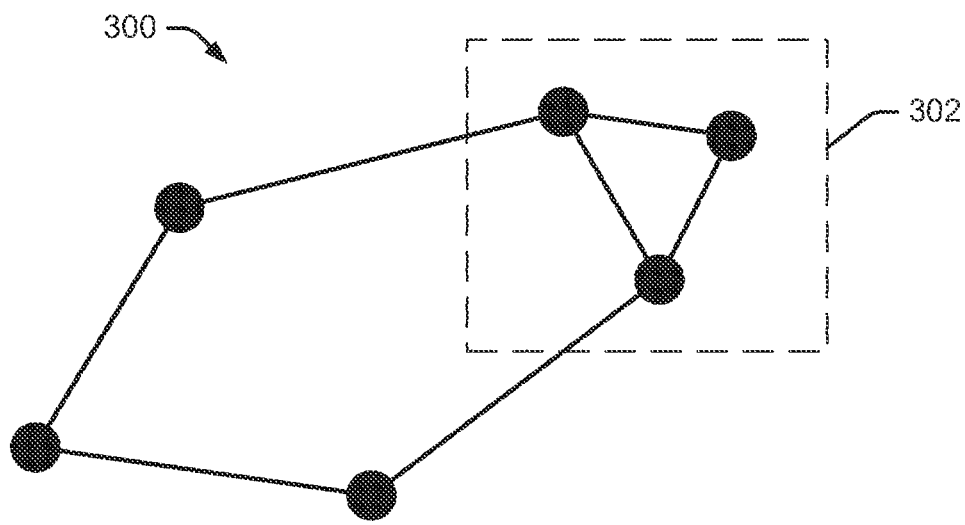
FIGS. 3A-3D depict varying levels of detail in different portions of a network environment.

FIGS. 3A-3D depict varying levels of detail in different portions of a network environment. FIG. 3A shows an entire network environment with minimal detail. The individual black dots in FIG. 3A may represent large geographic areas, such as a metropolitan area. Since FIG. 3A depicts the entire network environment, each black dot may include any number of network nodes, network connections, and sub-networks. An area 302, defined by broken lines, represents a particular portion of the entire network environment. Area 302 may be defined by clicking in the particular area of the network environment, defining a bounding box (e.g., as defined by the broken lines in FIG. 3a), and the like.

Figure 3B:
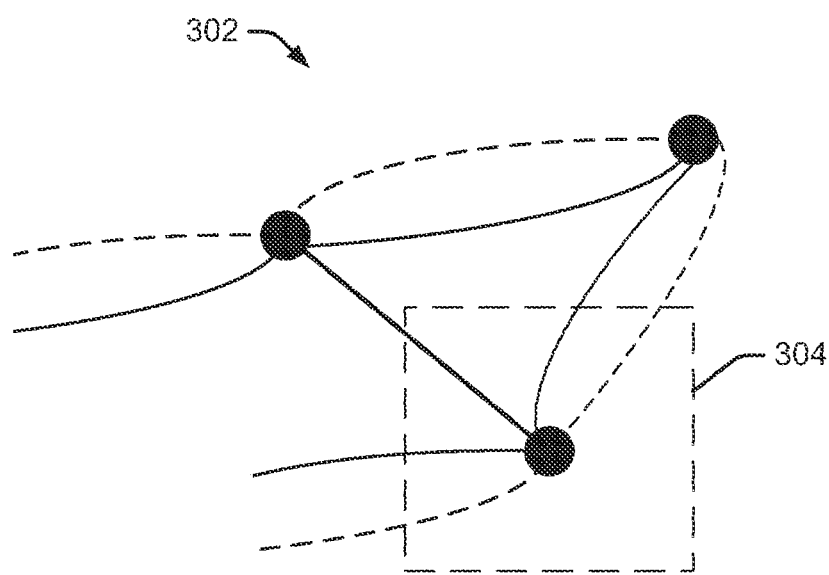

FIG. 3B depicts area 302 in greater detail and does not display the remaining portions of the entire network environment. Area 302 still includes three black dots, but FIG. 3B displays more detail regarding the connections between the black dots. For example, FIG. 3B shows both working paths (curved broken lines) and protection paths (curved solid lines), which were not shown separately in FIG. 3A. An area 304, defined by broken lines, represents a particular portion of area 302.

Figure 3C:
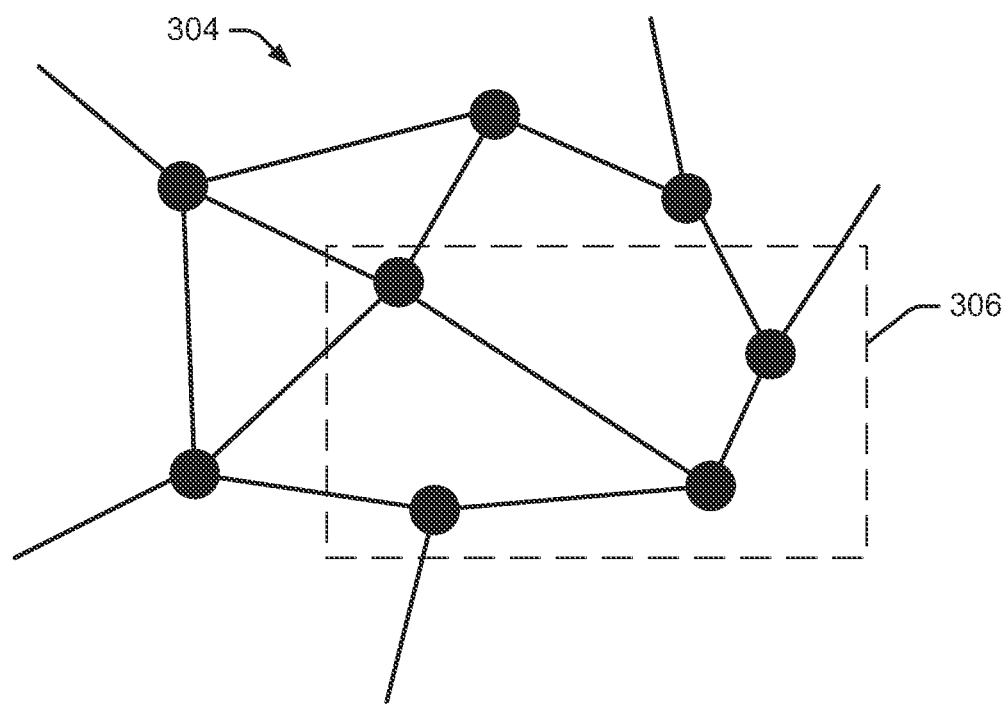

FIG. 3C depicts area 304 in greater detail. The single black dot shown in FIG. 3B has been expanded in FIG. 3C to show significantly more network details (i.e., eight dots and network connections therebetween). In some embodiments, the details shown in FIG. 3C represent one or more metropolitan rings contained within area 304 of the network environment. An area 306, defined by broken lines, represents a particular portion of area 304.

Figure 3D:
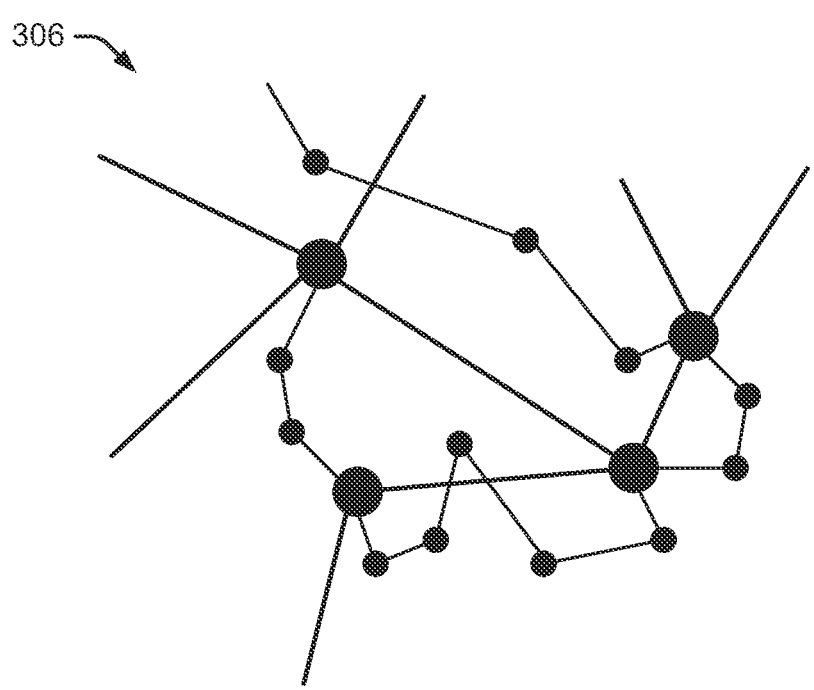

FIG. 3D depicts area 306 in greater detail. The four black dots in area 306 (as shown in FIG. 3C) are also shown in FIG. 3D, along with additional dots representing additional nodes, groups of nodes, sub-networks, etc. Additional network communication links are also shown in FIG. 3D. In some embodiments, the details shown in FIG. 3D represent one or more secondary rings (or secondary access rings) contained within area 306 of the network environment.

Although FIGS. 3A-3D show solid dots and solid lines, some embodiments may use different shapes, patterns, and colors to distinguish between different types of network nodes, network clusters, sub-networks, network communication links, and the like.

At any particular time, the displayed network graph (also referred to as a "map") shows a particular area (or portion) of the network environment. The displayed area can correspond to an actual geographic area, or it can correspond to an area in a virtual (i.e., imaginary) world. In the examples discussed below, the displayed map will represent a geographic area. In some embodiments, the displayed map may optionally show an actual geographic map as its background.

The map has a continuously or discretely adjustable zoom level which is represented by a number z, in the range of z=[0 . . . Z], where 0 (by convention) denotes the most detailed zoom level, and Z denotes the least detailed zoom level. Since the screen size is constant, z=0 displays the smallest geographic area, while z=Z shows the largest geographic area. Also by convention, one unit increase of the zoom level corresponds to doubling the span of the area shown in both the horizontal and vertical directions, that is, quadrupling the area shown. For instance, z=3.0 shows 4 times the area of what is shown at z=2.0. The user is typically provided with multiple input methods to navigate in the map, including zoom in, zoom out, pan left, pan right, pan down, pan up, and so forth.

For given range of zoom levels, the map is divided into a grid of fixed-size quadrants, which may be referred to as "tiles." The grid's starting coordinate and the width/height of the tiles are all fixed, and known to both a map display client and a backend server. Each tile also corresponds to a particular geographic area. In some embodiments, this geographic area is smaller than the overall geographic area displayed by the map (i.e., the displayed map is constructed from multiple tiles).

The size of the tiles and, therefore, the number of tiles needed cover the screen is typically chosen for various zoom level ranges such that the maximum number of tiles needed at any particular zoom level is always less than a predefined target constant. When using the above-described quadratic zoom convention, the typical tile configuration is such that there is one tile grid $G=g_1$ for zoom level range z=[0, 1), another the grid $g_2$, for zoom level range z=[1,2), $g_3$ for z=[2, 3), and so on, and the tile width and height for any $g_i$ is exactly half of the tile width and height of tiles in grid $g_{i+1}$.

Upon initial display of the map or after any zoom or panning operation (collectively referred to as a "refresh event"), the display client asks the server to identify the visual information to be displayed in each tile. In some embodiments, this is done on a tile-by-tile basis. Specifically, after a refresh event, the map client determines: (a) what is the current zoom level z, (b) what is the current viewable geographic area visible on the display, (c) what tile grid system G is applicable at the current zoom level, and (d) what is the agreed-upon starting coordinate and tile size for the current grid. Based on (a, b, c, and d), the client can determine what tiles are visible. The client then sends a "getTileData(z, G, x, y)" request to the server, where z is the zoom level, G represents the grid system, and x, y represents the geographic coordinates of the lower-left corner of the tile. The width and height of the tile is implicit from G. In some embodiments, G is omitted since G can be derived from the current zoom level. Upon receiving the request, the server determines what visual information is relevant for the particular tile, and encapsulates the necessary information in a response to the client.

In a particular implementation, a visual representation of the network map is generated using the following process. In its simplest form, the network is represented by a set of nodes (e.g., network elements) and edges (e.g., network links and circuits). Each node can be defined as n(i), where i is a node index, 1 through N, with N representing the total number of nodes. For this discussion, each node n(i) is defined by its geographic center coordinates, denoted as n(i)=(x, y). The edges are denoted as e(i), where i is in the range of 1 through E. In this example, each e(i) is defined by three pieces of data: e(i)=(n1, n2, m), where n1 is the index of its origin node, n2 is the index of its destination node, and m is the maximum zoom level at which the edge is to be shown. The latter is determined based on the "importance" of a link. For example, if for an edge e(i), e(i).m=4.0, where e(i).m denotes the zoom threshold associated with edge e(i), then the given edge will be visible at all zoom levels z<=4.0. In some embodiments, the process uses the capacity/bandwidth and/or the geographic span (length) of the circuit. In other words, the higher the capacity of a circuit and/or the longer its distance, the higher its importance, hence the higher its in value should be, and therefore the higher the zoom level above which it should become hidden. As an extreme case, if m=Z, the link is always visible, across all zoom levels.

In an example embodiment, one approach uses the link capacity c(i) to derive m:

$$e(i).m=\min(Z, \max(M, A+B^*\log(C+c(i))))$$

where M, A, B, and C are all constants and where M controls the zoom level below which all circuits are guaranteed to be shown, and A, B, and C control the sensitivity of the visibility vs. circuit capacity. The logarithmic function is needed maintain proper sensitivity in the face of multiple order magnitude differences in circuit capacity. The min(Z, max(M, . . . )) formula effectively clamps in to be always in the range [M, Z].

Upon receiving a getTileData(z, G, x, y) request for a given tile, the server executes the following algorithm:

Step 1: the server looks up the tile width and height values for G, and formulates a bounding-box (BB)

$h$=grids($G$).$h$ $w$=grids($G$).$w$ $BB$=($x, y, w, h$).

Step 2: the server creates an empty set for all edges to be shown in the tile (the server will use this set to collect all edges that need to be visually displayed in the given tile $Se$=[].

Steps 3 and 4 iterate through all edges:

for each $e(i)$ in $i$=[1, $E$] do:

Step 4: and determine if the edge is to be displayed at the zoom level and if it is visible in a given tile (i.e., the line intersects the tile bounding-box):

if $e(i)$.m>=$z$ and intersects($e(i)$, $BB$) then:

$Se$+=$e(i)$ // adds the edge to the set

At this point, all edges that need to be shown are stored in set Se. The intersect(e(i), BB) function is a simple geometric/algebraic test that involves testing whether the line segment representing e(i) intersects the rectangle R representing BB. This can be determined based on two tests: (1) check if all points of R falls on one side of the infinite imagery line drawn from the segment, and (2) check if a second rectangle representing the line segment intersects with R. The former is tested by turning the line into a linear inequality f(x, v)>0, which is of the form y>Ex+F (E and F are constants). Any point (x, y) that satisfies f falls "above" the line. If corners of R fall all above or all below the line, the line does not intersect and hence the segment will not intersect R either. In this situation, it does not need to be included in the tile. In the opposite case, the (infinite) line surely intersects R, but this does not mean the segment actually intersects. This is when the second condition is tested by first turning the line segment into a rectangle S such that (a) the edges of the new rectangle S are parallel with the edges of R, and (b) where the (x1, y1) and (x2, y2) end-points of the segment become the diagonal corners of S. Once S and R are represented as two parallel rectangles, the goal is to determine if they have any overlap. Two rectangles do not have overlap if in both x and y dimensions of the two coordinates of one of the rectangle both fall on one side of the two coordinates of the other rectangle, i.e., their coordinates do not intermingle in either dimensions. More precisely, let Rxmin, Rxmax, Rymin, and Rymax represent the lowest and highest coordinates of rectangle R in the x and y dimensions, respectively. Let furthermore Sxmin, Sxmax, Symin and Symax do the same for rectangle S. The two rectangles have no overlap if and only if the following two conditions hold simultaneously:

($Rx$max<$Sx$min) or ($Rx$min>$Sx$max)

($Ry$max<$Sy$min) or ($Ry$min>$Sy$max)

In all other cases the rectangles intersect, which means that the segment needs to be shown.

The next steps in the process determine which nodes are shown in the map. In a single-layer network a node is shown if it has at least one visible edge using it as its origin n1 or destination n2 node:

Step 5: First create the set of all candidate nodes to contain all nodes used by any edges in set Se:

$Cn$=Set($e(i)$.$n$1 for each $e(i)$ in $Se$) $U$ Set($e(i)$.$n$2 for ach $e(i)$ in $Se$)

where U denotes the union set operation. At this point Cn contains the candidate nodes, but not all them will be shown in the map. The process needs to further filter the candidate nodes based on their intersection with the bounding box of the tile:

Step 6 and 7: Create the set of visible node Sn:

Sn=[](an empty set)

Step 7:

for each n(i) in Sn do:

if intersects(n(i), BB, z), then:

$Sn$+=$n(i)$

For this intersection test, the simplest method checks if n(i).(x, y) is inside BB. In some embodiments, there is an added complexity: the iconic/graphical representation of a node on the map is not infinitely small, but rather a constant (pixel) size, such as an icon or a small circle/disk, etc. Furthermore, the tiles are typically displayed with "clipping" behavior enabled. The latter ensures that whatever geometric shapes are drawn inside a given tile, they never "bleed" outside the edges of the tile. However, this can have an unwanted effect when a node symbol is too close to the edge of the tile: the symbol may become clipped. To circumvent this undesirable visual effect, the process relaxes the above intersection function, and declares an intersection even if the center coordinate of a node does not fall into the BB, but if the center is "close enough" to the edges of the tile. This is performed as follows:

Step 7.a: we generate a bounding box for the n(i), which can be denoted as bb(i)

Step 7.b: we check if bb(i) intersects with BB.

Step 8: Send back Se and Sn to the client.

The above "logical" algorithm is a reference algorith. In some situations, it ay not be practical to test every edge (and all resulting nodes) against each tile. Therefore, some embodiments optimize this algorithm. For example, some methods are based on the concept of (pre-organizing the edges into nested tree quadrants, where quadrants are lined up with tiles at various zoom levels. Each node contains a reference to all edges intersecting the node. Each node in such a quadrant tree is present if at least one edge intersects the node.

Other embodiments use the above approach and render different layers of the network as individual tiled adaptive levels of detail. These different layers depend on each other (i.e., transitive characteristic), and often the same network element participates in multiple layers. Each layer is visualized as described above, but on its own "plane", and these planes, like sandwiches, are rendered using a 3D effect. The views across the layers are visually coordinated: network elements shown in multiple layers are aligned across the layers. When zooming in or out, the view provides additional details in one or all of the layers involved.

In a multi-layered network, links/circuits are members of a particular layer. In some embodiments, links/circuits are members of only one layer. Circuits in a particular layer are visually independent of circuits in other layers, So, the notation discussed above is extended as follows:

An edge n(i, 1) represents an edge in layer 1.

getTileData(z, G, x, y, l) now contains the reference to the layer, 1, for which the request is made.

In one embodiment, the multi-layer rendering applies the above single-layer algorithm L times, once for each layer, where for a given layer the server considers edges that are members of a given layer denoted in the tile request.

In an alternate embodiment, the different layers are displayed in a manner that harmonizes what nodes are visible across all layers. In other words, if a node is visible in a certain layer (based on the original algorithm), then it is made visible across all displayed layers, even if this results in nodes shown at certain layers without having any edges. This alternate embodiment can be enabled/disabled by the user.

Figure 4:
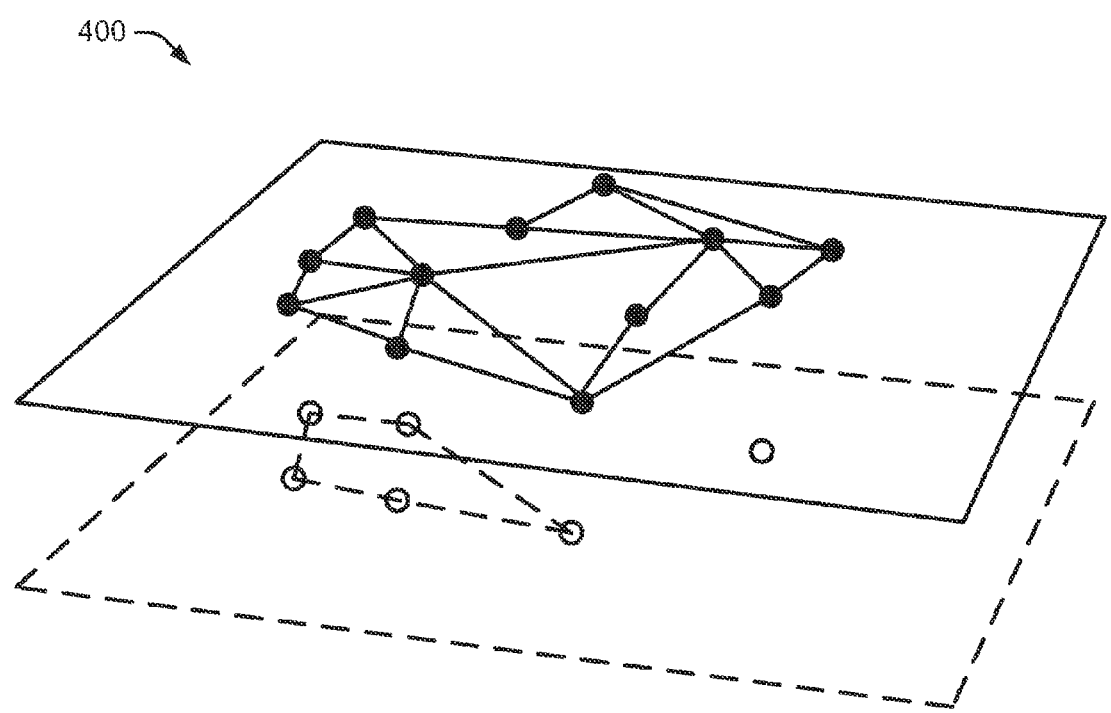
FIG. 4 depicts an embodiment of network map showing multiple network layers represented as separate planes.

FIG. 4 depicts an embodiment of network map 400 showing multiple network layers represented as separate planes. One layer is identified with solid lines and filled dots. The other layer is identified with broken lines and hollow dots. As shown in FIG. 4, the upper layer has a mesh arrangement, while the lower layer has a loop arrangement and one node that is not connected to the loop. Although two layers are shown in network map 400, alternate embodiments may include any number of layers shown in a three dimensional arrangement similar to FIG. 4.

Figure 5:
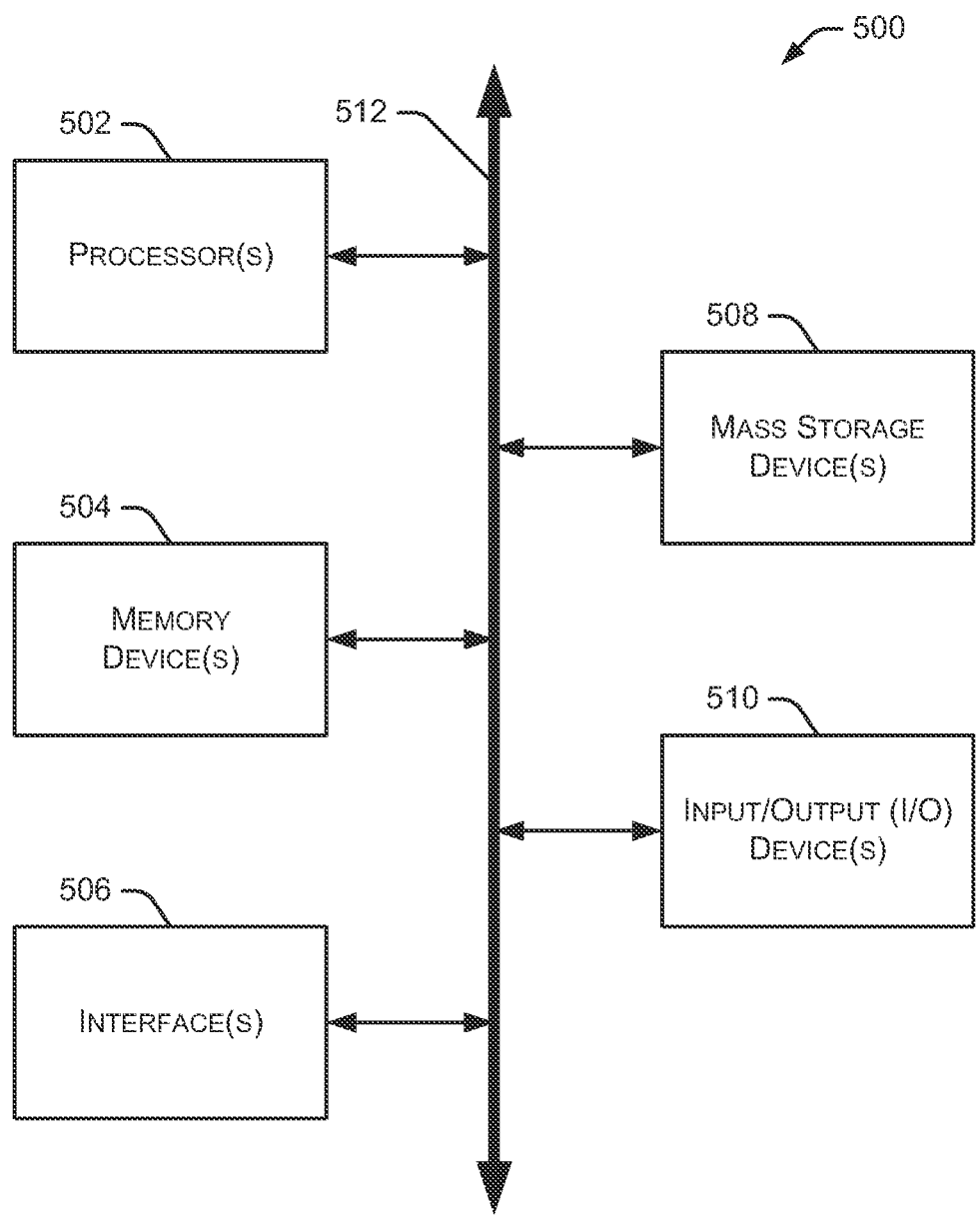
FIG. 5 is a block diagram depicting an example computing device.

FIG. 5 is a block diagram depicting an example computing device 500. Computing device 500 may perform, for example, tasks and operations discussed herein with respect to determining network data to display, generating network maps, implementing various algorithms, and the like. Computing device 500 may be used to perform various procedures, such as those discussed herein. Computing device 500 can function as a server, a client or any other computing entity. Computing device 500 can be any of a wide variety of computing devices, such as a desktop computer, a notebook computer, a server computer, a handheld computer, a tablet, a mobile device, a set top box, a portable entertainment device, and the like.

Computing device 500 includes one or more processor(s) 502, one or more memory device(s) 504, one or more interface(s) 506, one or more mass storage device(s) 508, and one or more Input/Output (I/O) device(s) 510, all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM)) and/or nonvolatile memory (e.g., read-only memory (ROM)). Memory device(s) 504 may also include rewritable ROM, such as Flash memory.

Mass storage device(s) 508 include various computer readable media, such as magnetic tapes, magnetic disks, optical disks, solid state memory (e.g., Flash memory), and so forth. Various drives may also be included in mass storage device(s) 508 to enable reading from and/or writing to the various computer readable media. Mass storage device(s) 508 include removable media and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Interface(s) 506 include various interfaces that allow computing device 500 to interact with other systems, devices, or computing environments. Example interface(s) 506 include any number of different network interfaces, such as interfaces to local area networks (LANs), wide area networks (WANs), wireless networks, and the Internet.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
a memory; and
one or more processors coupled to the memory, the one or more processors configured to
assign to each circuit of a plurality of circuits of network environment a score according to a function, the function increasing with increasing geographic length of the each circuit and with increasing carrying capacity of the each circuit, the each circuit connecting a pair of nodes of a plurality of nodes of the network environment, each node of the plurality of nodes being a network element,
display the network environment as a network graph using a first zoom level by displaying first circuits of the plurality of circuits having the scores thereof above a first value,
receive a request to provide a second zoom level in a particular portion of the network environment,
identify network components to display at the second zoom level in the particular portion of the network environment by identifying second circuits having the score thereof above a second value lower than the first value and identifying second nodes connected to the second circuits,
determine network connections to display at the second zoom level in the particular portion of the network environment, and
generate a revised network graph containing the identified network components and the determined network connections, the revised network graph including at least a portion of the first circuits, at least a portion of the first nodes, at least a portion of the second circuits, and at least a portion of the second nodes.

2. The apparatus of claim 1, wherein the second zoom level displays greater network details than the first zoom level.

3. The apparatus of claim 1, wherein the particular portion of the network environment is associated with a specific geographic area.

4. The apparatus of claim 1, wherein the particular portion of the network environment is associated with a metropolitan area.

5. The apparatus of claim 1, wherein the revised network graph further displays both the first network layer and the second network layer in a three-dimensional format.

6. The apparatus of claim 1, wherein the request to provide a second zoom level in a particular portion of the network environment is received from a user.

7. The apparatus of claim 1, wherein the revised network graph is generated by generation of a plurality of tiles such that each tile represents a portion of the revised network graph.

8. A method comprising:
assigning to each circuit of a plurality of circuits of network environment a score according to a function, the function increasing with increasing geographic length of the each circuit and with increasing carrying capacity of the each circuit, the each circuit connecting a pair of nodes of a plurality of nodes of the network environment, each node of the plurality of nodes being a network element;
displaying the network environment as a network graph using a first zoom level by displaying first circuits of the plurality of circuits having the scores thereof above a first value;
receiving a request to provide a second zoom level in a particular portion of the network environment;
identifying network components to display at the second zoom level in the particular portion of the network environment by identifying second circuits having the score thereof above a second value lower than the first value and identifying second nodes connected to the second circuits;
determining network connections to display at the second zoom level in the particular portion of the network environment; and
generating a revised network graph containing the identified network components and the determined network connections, the revised network graph including at least a portion of the first circuits, at least a portion of the first nodes, at least a portion of the second circuits, and at least a portion of the second nodes.

9. The method of claim 8, wherein the second zoom level displays greater network details than the first zoom level.

10. The method of claim 8, wherein the particular portion of the network environment is associated with a specific geographic area.

11. The method of claim 8, wherein the particular portion of the network environment is associated with a metropolitan area.

12. The method of claim 8, wherein the revised network graph further displays both the first network layer and the second network layer in a three-dimensional format.

13. The method of claim 8, wherein the request to provide a second zoom level in a particular portion of the network environment is received from a user.

14. The method of claim 8, wherein generating a revised network graph includes generating a plurality of tiles such that each tile represents a portion of the revised network graph.

15. An apparatus comprising:
circuitry configured to assign to each circuit of a plurality of circuits of network environment a score according to a function, the function increasing with increasing geographic length of the each circuit and with increasing carrying capacity of the each circuit, the each circuit connecting a pair of nodes of a plurality of nodes of the network environment, each node of the plurality of nodes being a network element;
circuitry configured to display the network environment as a network graph using a first zoom level by displaying first circuits of the plurality of circuits having the scores thereof above a first value;
circuitry configured to receive a request to provide a second zoom level in a particular portion of the network environment;
circuitry configured to identify network components to display at the second zoom level in the particular portion of the network environment by identifying second circuits having the score thereof above a second value lower than the first value and identifying second nodes connected to the second circuits;
circuitry configured to determine network connections to display at the second zoom level in the particular portion of the network environment; and
circuitry configured to generate a revised network graph containing the identified network components and the determined network connections, the revised network graph including at least a portion of the first circuits, at least a portion of the first nodes, at least a portion of the second circuits, and at least a portion of the second nodes.

16. The apparatus of claim 15, wherein the second zoom level displays greater network details than the first zoom level.

17. The apparatus of claim 15, wherein the particular portion of the network environment is associated with one of a specific geographic area and a metropolitan area.

18. The apparatus of claim 15, wherein the revised network graph further displays both the first network layer and the second network layer in a three-dimensional format.

19. The apparatus of claim 15, wherein the request to provide a second zoom level in a particular portion of the network environment is received from a user.

20. The apparatus of claim 15, wherein the revised network graph is generated by generation of a plurality of tiles such that each tile represents a portion of the revised network graph.

* * * * *